US008583368B1

(12) United States Patent
Sindlinger et al.

(10) Patent No.: US 8,583,368 B1
(45) Date of Patent: Nov. 12, 2013

(54) RULE BASED DEPICTION OF MINIMUM ALTITUDES

(75) Inventors: Andreas Sindlinger, Weinheim (DE); Karl Christian Pschierer, Ochsenfurt (DE)

(73) Assignee: The Boeing Company, Chicago, IL (US)

( * ) Notice: Subject to any disclaimer, the term of this patent is extended or adjusted under 35 U.S.C. 154(b) by 431 days.

(21) Appl. No.: 12/706,845

(22) Filed: Feb. 17, 2010

(51) Int. Cl.
*G01C 21/12* (2006.01)

(52) U.S. Cl.
USPC .......................................... 701/460

(58) Field of Classification Search
USPC .......................................... 701/406
See application file for complete search history.

(56) References Cited

U.S. PATENT DOCUMENTS

| | | | | |
|---|---|---|---|---|
| 4,224,669 | A * | 9/1980 | Brame | 701/8 |
| 5,566,073 | A * | 10/1996 | Margolin | 701/454 |
| 6,334,090 | B1 * | 12/2001 | Fujii | 701/468 |
| 6,456,940 | B1 * | 9/2002 | Higgins | 701/301 |
| 6,694,249 | B1 * | 2/2004 | Anderson et al. | 701/120 |
| 6,906,641 | B2 * | 6/2005 | Ishihara | 340/946 |
| 7,064,680 | B2 * | 6/2006 | Reynolds et al. | 340/961 |
| 7,095,423 | B2 * | 8/2006 | Cosman et al. | 345/629 |
| 7,327,285 | B2 * | 2/2008 | McCauley et al. | 340/963 |
| 8,032,268 | B2 * | 10/2011 | Burgin et al. | 701/8 |
| 8,200,416 | B2 * | 6/2012 | Aspen | 340/901 |
| 2002/0126040 | A1 * | 9/2002 | Block | 342/65 |
| 2003/0132860 | A1 * | 7/2003 | Feyereisen et al. | 340/973 |
| 2004/0015274 | A1 * | 1/2004 | Wilkins et al. | 701/3 |
| 2004/0160341 | A1 * | 8/2004 | Feyereisen et al. | 340/970 |
| 2004/0210847 | A1 * | 10/2004 | Berson et al. | 715/788 |
| 2005/0066275 | A1 * | 3/2005 | Gannon | 715/700 |
| 2005/0113985 | A1 * | 5/2005 | Greene | 701/9 |
| 2006/0227012 | A1 * | 10/2006 | He | 340/945 |
| 2006/0244638 | A1 * | 11/2006 | Lettau | 340/995.1 |
| 2007/0150124 | A1 * | 6/2007 | Wipplinger et al. | 701/3 |
| 2007/0168120 | A1 * | 7/2007 | Vandenbergh et al. | 701/208 |
| 2007/0168122 | A1 | 7/2007 | Aspen | |
| 2007/0250223 | A1 * | 10/2007 | Francois et al. | 701/9 |
| 2008/0215193 | A1 | 9/2008 | Hanson | |
| 2008/0269964 | A1 | 10/2008 | Majka | |
| 2009/0207048 | A1 * | 8/2009 | He et al. | 340/973 |

OTHER PUBLICATIONS

"Lido RouteManual", Lufthansa Systems, pp. 1-4, retrieved Dec. 29, 2009 http://www.lhsystem.com/resource/document/pdf/pb/pb_lido_routemanual.pdf.

* cited by examiner

*Primary Examiner* — Nicole Verley
(74) *Attorney, Agent, or Firm* — Yee & Associates, P.C.

(57) ABSTRACT

The different advantageous embodiments provide an apparatus comprising a data processing system and program code configured to run on the data processing system. The program code is configured to receive location information and generate display instructions for a moving map system using a number of display rules to display altitude information.

17 Claims, 7 Drawing Sheets

RULE BASED DEPICTION OF MINIMUM ALTITUDES

BACKGROUND INFORMATION

1. Field

The present disclosure relates generally to aircraft and more particularly to aeronautical information systems for use in operating aircraft. Still more particularly, the present disclosure relates to a moving map system for depicting minimum altitudes used in the operation of aircraft.

2. Background

Aeronautical charts depict many types of minimum altitudes to fly that indicate adequate vertical clearance from nearby terrain and manmade obstacles. Examples of minimum altitudes on charts are Minimum Off Route Altitudes (MORAs), Terminal Arrival Areas (TAAs) and Minimum Safe Altitudes (MSAs). While this application provides illustrative examples of Minimum Safe Altitudes (MSAs), the systems and methods described can be applied to many types of minimum altitudes depicted on dynamically generated charts.

A Minimum Safe Altitude (MSA) depiction typically includes a radius around a navigation aid on a map or chart. For example, Minimum Safe Altitude can be depicted as a twenty-five nautical mile circle around a navigation aid, where the navigation aid is used to indicate an airport on a chart or map. Minimum Safe Altitudes (MSAs) may include Minimum Reception Altitudes and Minimum Obstacle Clearance Altitudes, for example.

A Minimum Safe Altitude (MSA) radius typically includes one or more altitudes corresponding to a portion of the radius. For example, a radius might be sub-divided into sections defined by radials, with each radial having a corresponding altitude that an aircraft should keep as a minimum to clear terrain or obstacles in that section of the radius.

Charts and maps depicting areas around an airport usually contain large amounts of information. As a result, this area of the charts and map tends to be cluttered with graphical elements. A Minimum Safe Altitude (MSA) radius is often depicted as a separate black and white element in a different region of the chart apart from the geographical map depiction on paper charts. In some electronic charts, a Minimum Safe Altitude (MSA) radius is depicted as a static graphic overlay of the geographical map.

Therefore, it is advantageous to have a method and apparatus that takes into account one or more of the issues discussed above, as well as possibly other issues.

SUMMARY

The different advantageous embodiments provide an apparatus comprising a data processing system and program code configured to run on the data processing system. The program code is configured to receive location information and generate display instructions for a moving map system using a number of display rules to display altitude information.

The different advantageous embodiments further provide a method for dynamic depiction of minimum altitude information. Dynamic location information is received for an aircraft. A position and an altitude of the aircraft is identified using the dynamic location information. A number of display rules corresponding to the position and the altitude are identified. Display instructions are generated using the number of display rules. The display instructions are transmitted to a moving map system.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
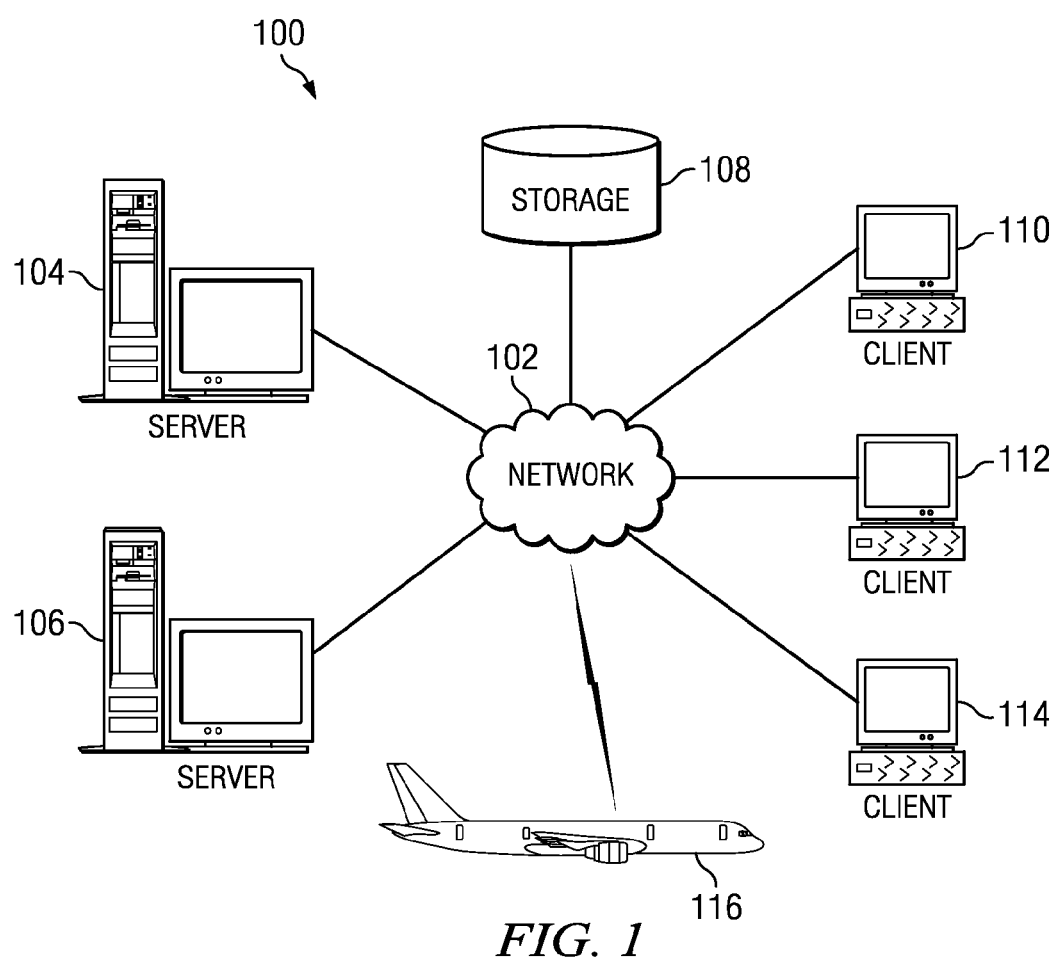
FIG. 1 is an illustration of a network of data processing systems in which the advantageous embodiments may be implemented.
Figure 2:
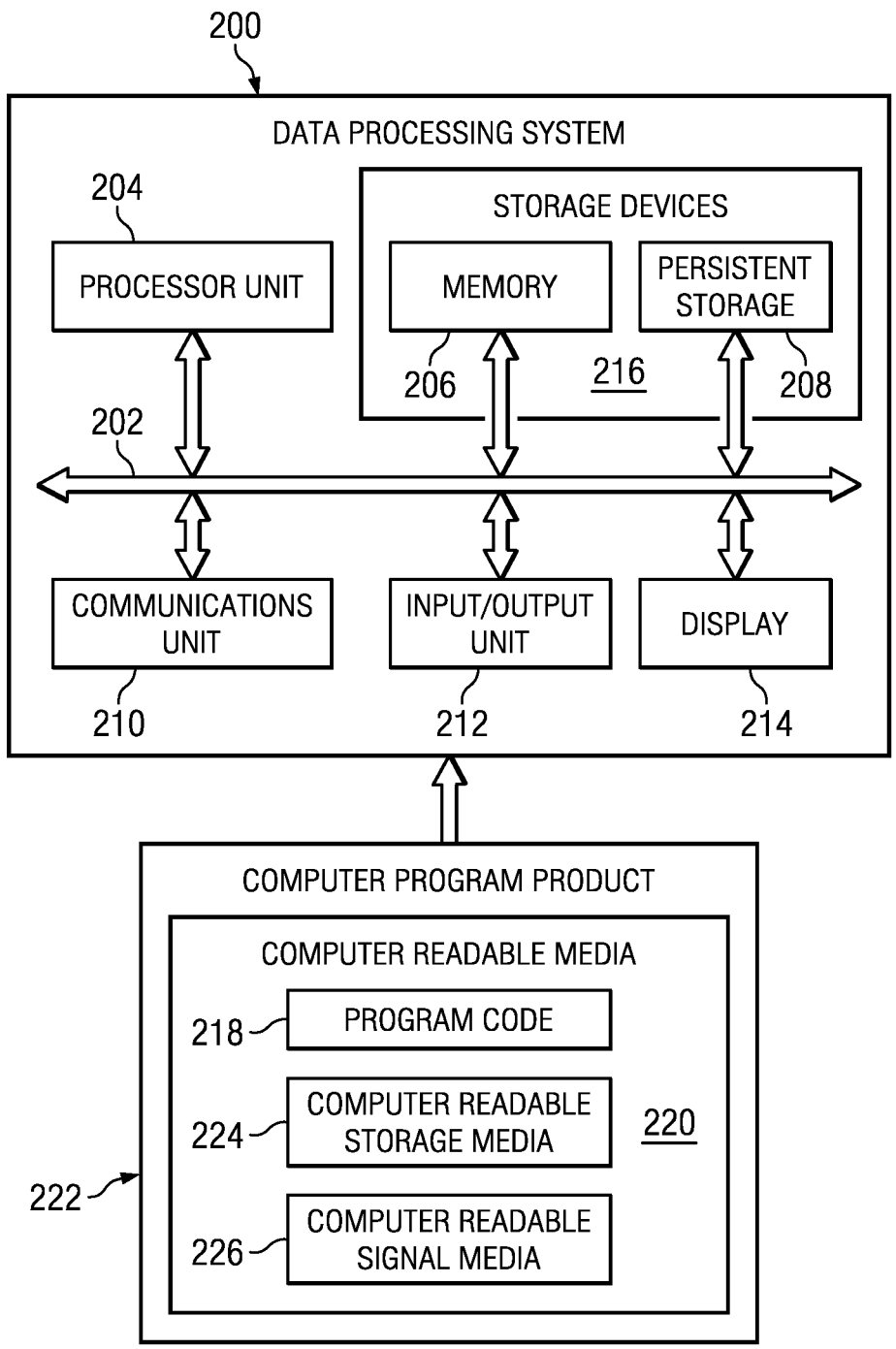
FIG. 2 is an illustration of a data processing system in accordance with an advantageous embodiment.

With reference now to the figures and in particular with reference to FIGS. 1-2, exemplary diagrams of data processing environments are provided in which the advantageous embodiments of the present invention may be implemented. It should be appreciated that FIGS. 1-2 are only exemplary and are not intended to assert or imply any limitations with regard to the environments in which different embodiments may be implemented. Many modifications to the depicted environments may be made.

With reference now to the figures, FIG. 1 depicts a pictorial representation of a network of data processing systems in which the advantageous embodiments of the present invention may be implemented. Network data processing system 100 is a network of computers in which embodiments may be implemented. Network data processing system 100 contains network 102, which is the medium used to provide communications links between various devices and computers, connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Aircraft 116 also is a client that may exchange information with clients 110, 112, and 114. Aircraft 116 also may exchange information with servers 104 and 106. Aircraft 116 may exchange data with different computers through a wireless communications link while in-flight, or any other type of communications link while on the ground. In these examples, server 104, server 106, client 110, client 112, and client 114 may be computers. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as, for example, an intranet, a local area network (LAN), or a wide area network (WAN). As used herein, a number of items means one or more items. For example a number of different types of networks is one or more different types of networks. FIG. 1 is intended as an example, and not as an architectural limitation for different embodiments.

Turning now to FIG. 2, a diagram of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-core processor, or multiple central processing units (CPUs), depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system, including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

The different advantageous embodiments recognize and take into account a number of different considerations. For example, the different advantageous embodiments recognize and take into account that current methods of depicting minimum altitudes often utilize paper charts depicting an area around a location, such as an airport. These paper charts contain a plethora of information, which results in the depiction of the area around the location being cluttered with graphical elements. The important minimum altitude information is often inconspicuous and hard to see, especially in low lighting situations.

The different advantageous embodiments further recognize and take into account that current methods of depicting minimum altitudes often utilize electronic charts with static minimum altitude information around a given location. Often, these static depictions are presented in a color that blends in with terrain data, which can interfere with terrain data and leads to difficulty in identifying the minimum altitude information.

Thus, the different advantageous embodiments provide an apparatus comprising a data processing system and program code configured to run on the data processing system. The program code is configured to receive location information and generate display instructions for a moving map system using a number of display rules to display altitude information.

The different advantageous embodiments further provide a method for dynamic depiction of minimum altitude information. Dynamic location information is received for an aircraft. A position and an altitude of the aircraft is identified using the dynamic location information. A number of display rules corresponding to the position and the altitude are identified. Display instructions are generated using the number of display rules. The display instructions are transmitted to a moving map system.

Figure 3:
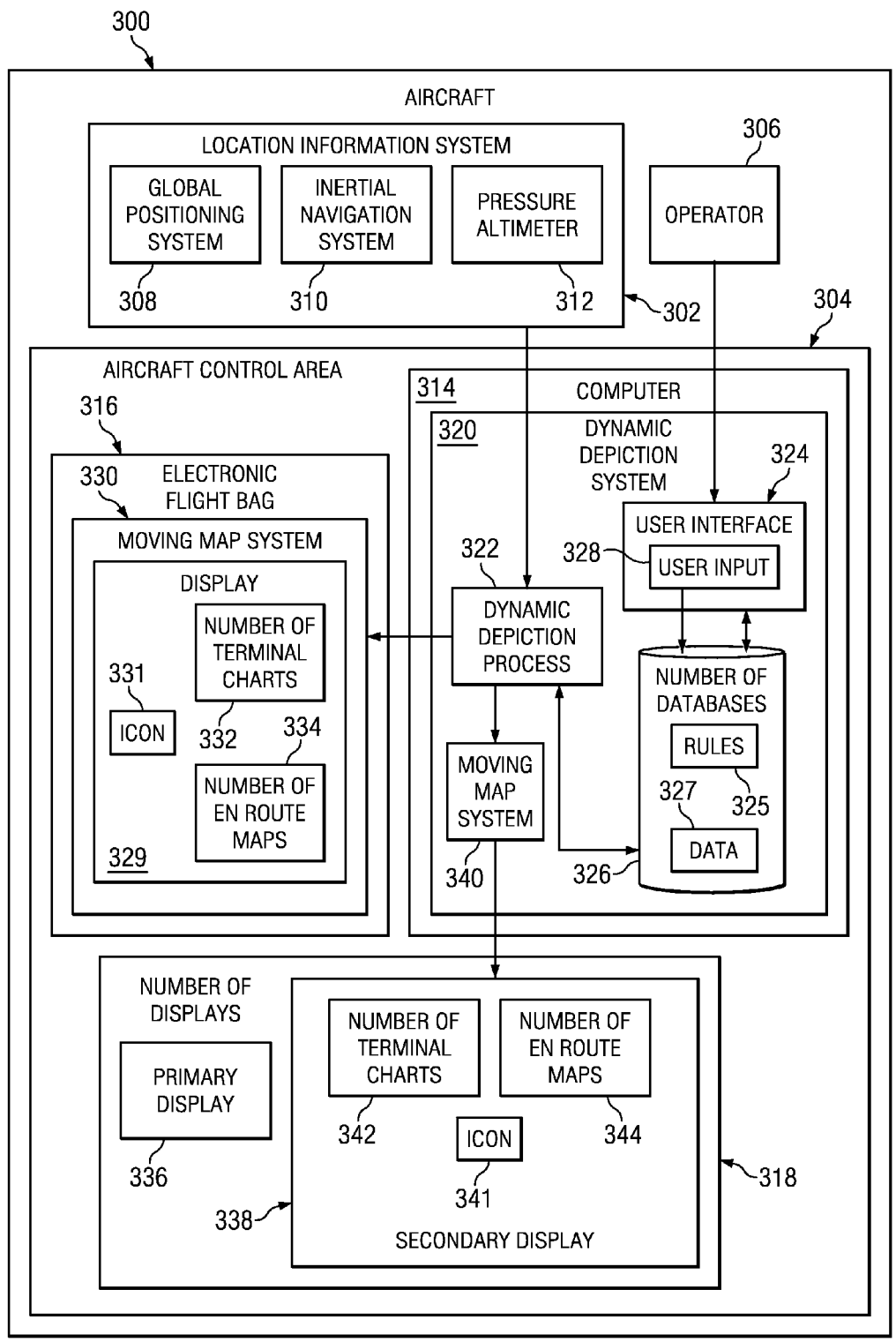
FIG. 3 is an illustration of an aircraft in accordance with an advantageous embodiment.

With reference now to FIG. 3, an illustration of an aircraft is depicted in accordance with an advantageous embodiment. Aircraft 300 may be an illustrative example of one implementation of aircraft 116 in FIG. 1.

Aircraft 300 may include location information system 302, aircraft control area 304, and operator 306. Location information system 302 is a number of systems used to determine location information for aircraft 300. Location information may include, for example, without limitation, position, geographic location, altitude, time of day, date, and/or any other suitable location information.

Location information system 302 may include systems such as, without limitation, global positioning system 308, inertial navigation system 310, pressure altimeter 312, and/or any other suitable system. Pressure altimeter 312 measures the altitude of aircraft 300 above a fixed level. Inertial navigation system 310 uses a computer, accelerometers, and gyroscopes to continuously calculate via dead reckoning the position, orientation, and velocity of aircraft 300. Global positioning system 308 is a well-known navigation aid that provides positioning, timing, and navigation services.

Aircraft control area 304 is an area from which operator 306 controls an aircraft. Aircraft control area 304 may be, for example, without limitation, a cockpit, flight deck, or any other suitable control area for aircraft 300. Operator 306 may be, for example, without limitation, a human, robotic machine, computer program, and/or any other suitable operator of aircraft 300.

Aircraft control area 304 may include computer 314, electronic flight bag 316, and number of displays 318. Computer 314 may be implemented using data processing system 200 in FIG. 2, for example. Computer 314 includes dynamic depiction system 320. Dynamic depiction system 320 receives dynamic location information from location information system 302, and uses the dynamic location information to control a dynamic depiction of a minimum altitude for aircraft 300.

Dynamic depiction system 320 is software in these examples and includes dynamic depiction process 322, user interface 324, and number of databases 326. Dynamic depiction process 322 receives the location information for aircraft 300 dynamically from location information system 302, and process the location information against rules 325 and data 327 stored in number of databases 326. Rules 325 include display rules for dynamic depiction process 322 such as, for example, without limitation, which features should be displayed, zoom levels for a dynamic depiction, colors, symbol styles, and/or any other suitable display rule. Rules 325 stored in number of databases 326 may be updated and/or configured by operator 306 via user input 328 using user interface 324. Data 327 stored in number of databases 326 may include, for example, without limitation, Minimum Safe Altitude (MSA) data, Minimum Off Route Altitude (MORA) data, Terminal Arrival Area (TAA) data, navigation data, obstacle data, terrain data, and/or any other suitable data. Minimum Safe Altitude (MSA) data, Minimum Off Route Altitude (MORA) data, Terminal Arrival Area (TAA) data may include information such as, for example, without limitation, radial center, radial start, radial end, altitude, and/or any other suitable information. Navigation data may include, for example, without limitation, airport locations. Dynamic depiction process 322 generates display instructions dynamically for a moving map system using the current location information for aircraft 300 from location information system 302 along with rules 325 and data 327 from number of databases 326.

Electronic flight bag 316 is an electronic information management device capable of displaying aviation data. Electronic flight bag 316 may be implemented using data processing system 200 in FIG. 2, for example. Electronic flight bag 316 includes moving map system 330. Moving map system 330 is an application capable of dynamically creating and/or displaying a number of navigation charts, such as number of terminal charts 332 and number of en route maps 334, based on a current position of aircraft 300. Moving map system 330 includes display 329. Moving map system 330 may display icon 331 on display 329. Icon 331 represents aircraft 300 and the location of aircraft 300 relative to different objects on number of terminal charts 332 and/or number of en route maps 334. The depiction of icon 331 over display 329 changes as aircraft 300 changes location, or moves, for example.

Number of terminal charts 332 is a collection of one or more aeronautical charts that depict areas surrounding airports. Number of en route maps 334 is a collection of one or more aeronautical charts depicting relevant information on larger scale areas aircraft 300 may travel over from location to location. Number of terminal charts 332 and number of en route maps 334 may be dynamically created on-the-fly, based on the current location of aircraft 300, using dynamic depiction process in one advantageous embodiment. In another advantageous embodiment, number of terminal charts 332 and number of en route maps 334 may be static, preprocessed maps over which dynamic depiction process 322 presents a dynamic overlay of minimum altitude information based on the current location of aircraft 300.

Number of displays 318 may be an illustrative example of display 214 in FIG. 2, for example. Number of displays 318 includes primary display 336 and secondary display 338. Primary display 336 is an aircraft instrument dedicated to flight information for aircraft 300. Primary display 336 may be, for example, a primary flight display (PFD) for aircraft control area 304. Secondary display 338 is a screen with a number of operator-selectable options used to display information in a number of configurable ways. Secondary display 338 may be, for example, a multi-function display (MFD) for aircraft control area 304.

Secondary display 338 may receive display information from moving map system 340. Moving map system 340 is similar to moving map system 300 implemented on electronic flight bag 316. Moving map system 340 may be implemented in computer 314 and associated with number of displays 318, in this illustrative example. Moving map system 340 may display icon 341. Icon 341 represents aircraft 300 and the location of aircraft 300 relative to different objects on number of terminal charts 342 and/or number of en route maps 344. The display of icon 341 changes as aircraft 300 changes location, or moves, for example. Moving map system 340 displays number of terminal charts 342 and number of en route maps 344 using secondary display 338. Number of terminal charts 342 and number of en route maps 344 are similar to number of terminal charts 332 and number of en route maps 334.

The illustration of aircraft 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, computer 314 may be implemented remote from aircraft 300 and configured to send wireless display instructions to number of displays 318 and/or electronic flight bag 316. In another illustrative example, dynamic depiction system 320 may be implemented on electronic flight bag 316. In yet another illustrative example, computer 314 may be located on aircraft 300 but outside aircraft control area 304.

Figure 4:
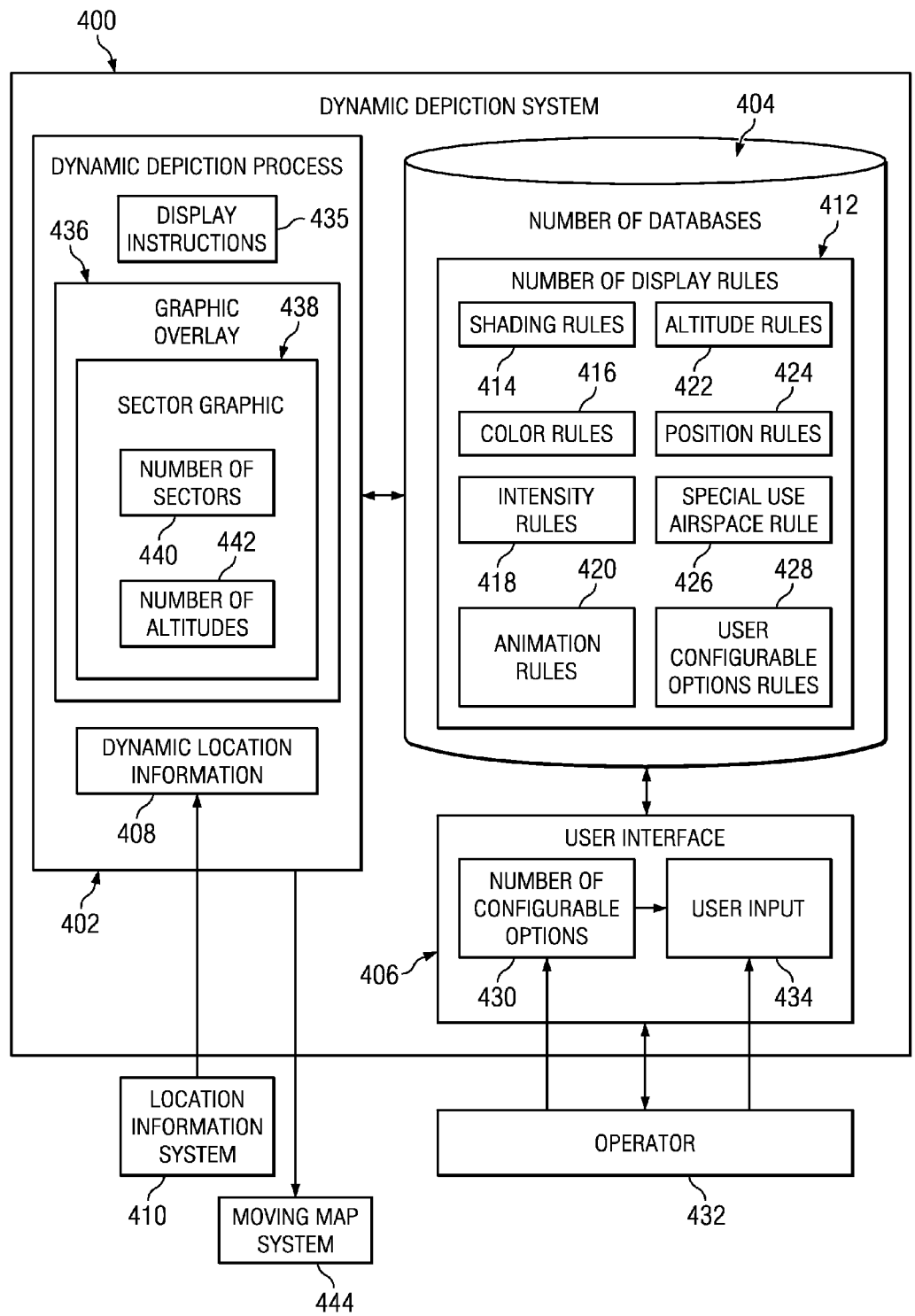
FIG. 4 is an illustration of a dynamic depiction system in accordance with an advantageous embodiment.

With reference now to FIG. 4, an illustration of a dynamic depiction system is depicted in accordance with an advantageous embodiment. Dynamic depiction system 400 is an illustrative example of one implementation of dynamic depiction system 320 in FIG. 3.

Dynamic depiction system 400 includes dynamic depiction process 402, number of databases 404, and user interface 406. Dynamic depiction process 402 is an illustrative example of one implementation of dynamic depiction process 322 in FIG. 3. Dynamic depiction process 402 receives dynamic location information 408 from location information system 410. Location information system 410 is an illustrative example of one implementation of location information system 302 in FIG. 3.

Dynamic depiction process 402 compares dynamic location information 408 against number of display rules 412 in number of databases 404. Number of display rules 412 includes rules and/or sets of rules that trigger an action in response to dynamic location information 408. Dynamic location information 408 may indicate, for example, that an aircraft is flying at a certain altitude, is at a particular distance from a location, is at a particular distance from an object, and/or any other suitable location information. Number of display rules 412 may include, for example, without limitation, shading rules 414, color rules 416, intensity rules 418, animation rules 420, altitude rules 422, position rules 424, special use airspace rules 426, user configurable options rules 428, and/or any other suitable rules.

One illustrative example of a display rule action triggered by a rule or set of rules may be having a minimum altitude area highlighted and text for the minimum altitude bolded when an aircraft is at an altitude of 1,000 feet or less above the minimum altitude while flying on a vector or flight plan that would enter the minimum altitude airspace within two minutes. Another illustrative example of a display rule action would be to cause the minimum airspace to be highlighted and text bolded when an aircraft is on a flight path or flight plan that will descend to within 1,000 feet above the minimum altitude in the minimum altitude boundaries Shading rules 414 may include a number of rules corresponding to a number of altitudes and/or positions, where each rule is associated with a different shading pattern, for example. Color rules 416 may include a number of rules corresponding to a number of altitudes and/or positions, where each rule is associated with a different color, for example. Intensity rules 418 may include a number of rules corresponding to a number of altitudes and/or positions, where each rule is associated with a different intensity, for example, such as a degree of boldness or opaqueness of a graphic or text. Animation rules 420 may include a number of rules corresponding to a number of altitudes and/or positions, where each rule is associated with a different animation, for example. Animation may include, for example, without limitation, flashing, strobing, blinking, and/or any other suitable animation.

Altitude rules 422 may include a number of rules corresponding to a number of different altitudes, where each rule is associated with a different altitude, for example. Position rules 424 may include a number of rules corresponding to a number of different positions, where each rule is associated with a different position, for example. Special use airspace rules 426 may include a number of rules corresponding to a number of different airspace locations, where each rule is associated with a different airspace location, for example. The number of different airspace locations may include, for example, no-fly zones, restricted fly zones, and/or any other suitable special use airspace. User configurable options rules 428 may include user configurable options and a number of rules corresponding to a number of different user configurable options available within dynamic depiction system 400, such as number of configurable options 430.

User interface 406 includes number of configurable options 430. Number of configurable options 430 may be modified by operator 432 to generate user input 434. Operator 432 may optionally input user input 434 directly into user interface 402. Number of configurable options 430 may include, for example, without limitation, relevant altitude for graphic display, preferred color for graphic display, preferred intensity for graphic display, preferred animation for graphic display, preferred shading for graphic display, and/or any other suitable configurable option.

User input 434 may be stored in user configurable options rules 428 of number of databases 404. When dynamic depiction process 402 accesses number of databases 404 to compare dynamic location information 408 against number of display rules 412, a number of user configured options may override default rules in number of display rules 412.

Dynamic depiction process 402 compares dynamic location information 408 against number of display rules 412 to generate display instructions 435 and/or graphic overlay 436. Display instructions 435 tell moving map system 444 which features to display and how each feature should be displayed. A feature may be, for example, a terminal chart or en route map, such as number of terminal charts 332 and/or number of en route maps 334 in FIG. 4, for example. Graphic overlay 436 is a dynamic graphic depicting information displayed over a number of features on moving map system 444. For example, graphic overlay 436 may be displayed over a terminal chart or en route map. Graphic overlay 436 may include sector graphic 438, for example. Sector graphic 438 may be a graphical radius having number of sectors 440 and number of altitudes 442. Number of sectors 440 divides sector graphic 438 into regions, where each region or sector is associated with an altitude from number of altitudes 442. Number of altitudes 442 may be the minimum vertical distance from terrain and obstacles in the associated sector that should be maintained by an aircraft, such as aircraft 300 in FIG. 3.

Dynamic depiction process 402 continuously receives dynamic location information 408 from location information system 410, processes dynamic location information 408 to generate display instructions 436, and dynamically transmits display instructions 436 to moving map system 444 for display.

The illustration of dynamic depiction system 400 in FIG. 4 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 5:
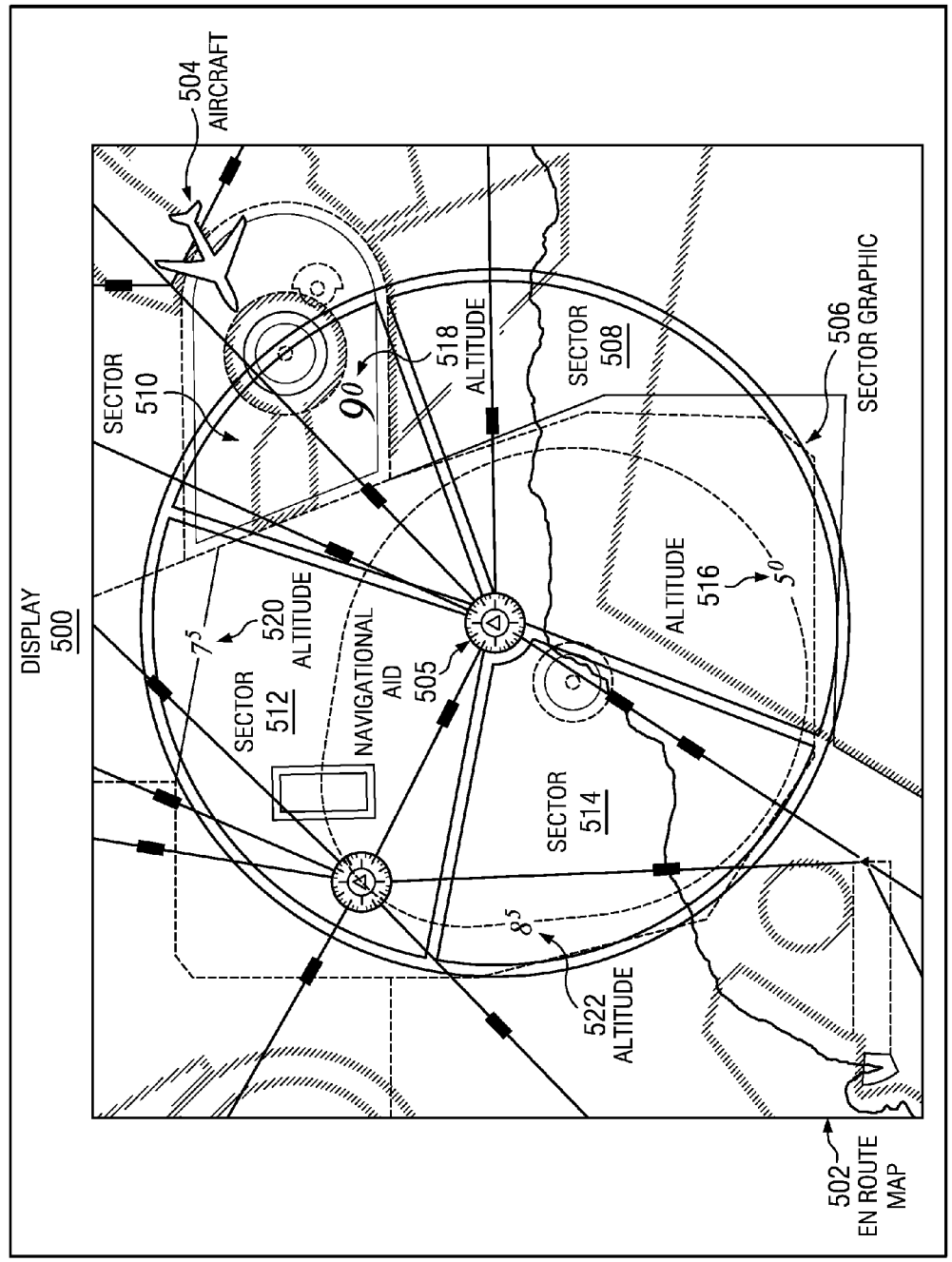
FIG. 5 is an illustration of a display in accordance with an advantageous embodiment.

With reference now to FIG. 5, an illustration of a display is depicted in accordance with an advantageous embodiment. Display 500 is an illustrative example of one implementation of secondary display 338 and/or display 329 in FIG. 3.

Display 500 depicts en route map 502. En route map 502 may be an illustrative example of one type of number of en route maps 334 and/or number of en route maps 344 in FIG. 3, for example. En route map 502 depicts the current location of aircraft 504 relative to navigational aid 505. Navigational aid 505 may mark a location or object such as, for example, an airport.

Sector graphic 506 is an illustrative example of sector graphic 438 generated by dynamic depiction system 400 in FIG. 4. Sector graphic 506 includes sector 508, sector 510, sector 512, and sector 514. Sector 508, sector 510, sector 512, and sector 514 may be an illustrative example of number of sectors 440 in FIG. 4. Each of sector 508, sector 510, sector 512, and sector 514 is associated with a corresponding altitude. Sector 508 is associated with altitude 516, sector 510 is associated with altitude 518, sector 512 is associated with altitude 520, and sector 514 is associated with altitude 522.

In this illustrative example, the sector closest to the approach of aircraft 504 is sector 510. Sector 510 is depicted with corresponding altitude 518 having a larger font size than the corresponding altitudes of the other sectors. In this example, altitude 518 is highlighted in the display of sector graphic 506 with a larger font size in order to alert an operator of aircraft 504 of a relevant altitude requirement for the approaching sector of en route map 502.

The illustration of display 500 in FIG. 5 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, other graphical features may be highlighted or displayed with intensity other than a font size for altitude 518. In one advantageous embodiment, sector 510 may be illustrated in a different color or shading than sectors 508, 512, and 514. In another advantageous embodiment, altitude 518 may be animated to flash at a given rate of speed to attract attention within the display of en route map 502.

Figure 6:
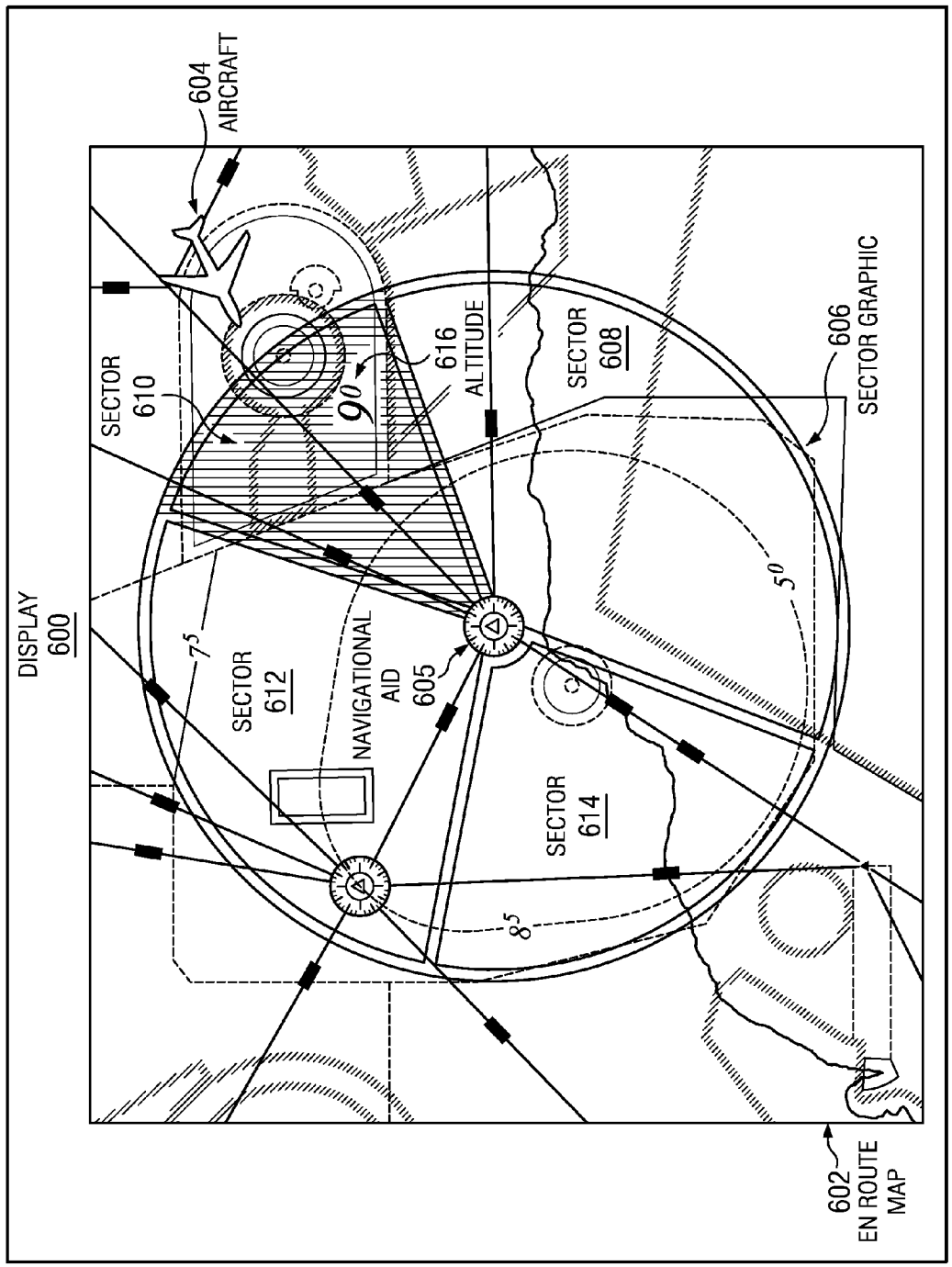
FIG. 6 is an illustration of a display in accordance with an advantageous embodiment.

With reference now to FIG. 6, an illustration of a display is depicted in accordance with an advantageous embodiment. Display 600 is an illustrative example of one implementation of secondary display 338 and/or display 329 in FIG. 3.

Display 600 depicts en route map 602. En route map 602 may be an illustrative example of one type of number of en route maps 334 and/or number of en route maps 344 in FIG. 3, for example. En route map 602 depicts the location of aircraft 604 relative to navigational aid 605. Navigational aid 605 may mark a location or object such as, for example, an airport.

Sector graphic 606 is an illustrative example of sector graphic 438 generated by dynamic depiction system 400 in FIG. 4. Sector graphic 606 includes sector 608, sector 610, sector 612, and sector 614. Sector 608, sector 610, sector 612, and sector 614 may be an illustrative example of number of sectors 440 in FIG. 4. Each of sector 608, sector 610, sector 612, and sector 614 is associated with a corresponding altitude. Sector 610 is associated with altitude 616, which is the highest altitude of each of sectors 608, 610, 612, and 614.

In this illustrative example, sector 610 is depicted with shading while sectors 608, 612, and 614 are depicted with outlining, indicating that sector 610 is important to the current position of aircraft 604. In this example, sector 610 also includes altitude 616 in a bold and enlarged font to highlight the altitude associated with the sector of importance to the current position of aircraft 604 depicted in sector graphic 606. A sector may be of importance to the current position of aircraft 604, in one example, if a minimum safe altitude for the sector is within a critical distance of the current altitude of the aircraft.

The illustration of display 600 in FIG. 6 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 7:
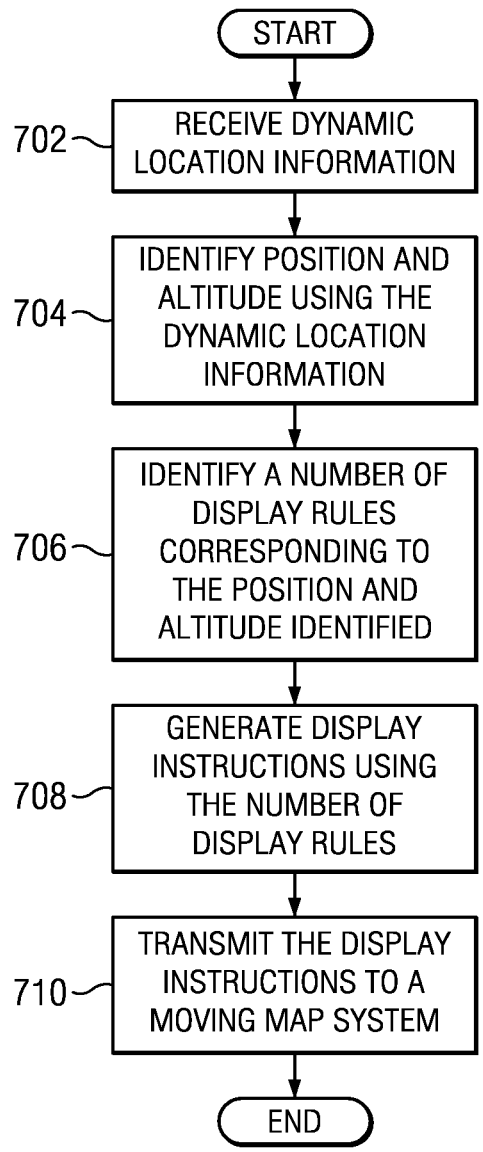
FIG. 7 is an illustration of a flowchart illustrating a process for dynamic depiction of minimum safe altitude information in accordance with an advantageous embodiment.

With reference now to FIG. 7, a flowchart illustrating a process for dynamic depiction of minimum safe altitude information is depicted in accordance with an advantageous embodiment. The process in FIG. 7 may be implemented by a component such as dynamic depiction system 400 in FIG. 4.

The process begins by receiving dynamic location information (operation 702). The dynamic location information may be received from a location information system, such as location information system 302 in FIG. 3.

The process identifies position and altitude using the dynamic location information (operation 704). The position and altitude may be provided in the dynamic location information received from the location information system. The process identifies a number of display rules corresponding to the position and the altitude identified (operation 706). The number of display rules may be located in a database, such as number of databases 326 in FIG. 3, for example. The number of display rules may be default rules and/or customized rules configured by an operator via a user interface, such as user interface 324 in FIG. 3, for example.

The process generates display instructions using the number of display rules (operation 708). The display instructions may include a sector graphic to overlay on a display of a terminal chart or en route map, for example. The process then transmits the display instructions to a moving map system (operation 710), with the process terminating thereafter.

The process in FIG. 7 may be a dynamic process that runs continuously during a flight, with continuous receipt of location information triggering generation of display instructions for dynamic transmission to a moving map system of an aircraft.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The different advantageous embodiments recognize and take into account a number of different considerations. For example, the different advantageous embodiments recognize and take into account that current methods of depicting minimum altitudes often utilize paper charts depicting an area around a location, such as an airport. These paper charts contain a plethora of information, which results in the depiction of the area around the location being cluttered with graphical elements. The important minimum altitude information is often inconspicuous and hard to see, especially in low lighting situations.

The different advantageous embodiments further recognize and take into account that current methods of depicting minimum altitudes often utilize electronic charts with static minimum altitude information around a given location. Often, these static depictions are presented in a color that blends in with terrain data, which can interfere with terrain data and leads to difficulty in identifying the minimum altitude information.

Thus, the different advantageous embodiments provide an apparatus comprising a data processing system and program code configured to run on the data processing system. The program code is configured to receive location information and generate display instructions for a moving map system using a number of display rules to display altitude information.

The different advantageous embodiments further provide a method for dynamic depiction of minimum altitude information. Dynamic location information is received for an aircraft. A position and an altitude of the aircraft is identified using the dynamic location information. A number of display rules corresponding to the position and the altitude are identified. Display instructions are generated using the number of display rules. The display instructions are transmitted to a moving map system.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a data processing system;
a location information system in an aircraft;
an electronic flight bag;
a primary flight display dedicated to flight information for the aircraft and a secondary display in control area of the aircraft, wherein the secondary display is a multi-function display configured to receive display information from a moving map system in the electronic flight bag and in the data processing system, wherein the moving map system dynamically creates and displays a moving map based on a current location of an aircraft from the location information system and a terminal chart or an enroute map;
program code configured to run on the data processing system to receive location information from the location information system and to dynamically generate display instructions for the moving map using a current location of the aircraft;
wherein the secondary display is configured by a user selection of a number of display rules at an interface, wherein the number of display rules cause the secondary display to display the moving map and to display a minimum safe altitude information on the moving map for an aircraft approaching one of a plurality of sectors of a circle centered on a navigational aide, each of the plurality of sectors displaying corresponding minimum safe altitude information.

2. The apparatus of claim 1, wherein the program code is for a dynamic depiction process and wherein a display instruction presents the minimum safe altitude information for an aircraft in a color that does not blend in with a terrain data so that the terrain data does not impede identifying a minimum safe altitude.

3. The apparatus of claim 1, wherein the program code is further configured to run on the data processing system to display a map using the display instructions and to highlight an airspace and bold a text associated with a minimum safe altitude for the airspace when an aircraft descends to a distance above the minimum safe altitude.

4. The apparatus of claim 1 further comprising:
a number of databases, wherein the number of display rules are stored in the number of databases and wherein a display rule highlights an airspace and bolds a text associated with a minimum safe altitude when an aircraft is flying on a vector that will bring the aircraft into a sector with the minimum safe altitude in a period of time wherein data stored in the number of databases includes Minimum Safe Altitude (MSA) data, Minimum Off Route Altitude (MORA) data, Terminal Arrival Area (TAA) data, navigation data, obstacle data, and terrain data wherein the MSA data, the MORA data, and the TAA data include a radial center, a radial start, a radial end, and an altitude.

5. The apparatus of claim 1 further comprising:
a user interface having a number of configurable options associated with the number of display rules, wherein the number of configurable options include selecting a distance above a minimum safe altitude that will invoke a display rule when an aircraft descends to the distance above the minimum safe altitude.

6. The apparatus of claim 1, wherein the program code is configured to run on the data processing system to receive location information and generate a graphic overlay, and wherein the graphic overlay, responsive to a display rule, alerts an operator of an aircraft of a minimum safe altitude requirement for an approaching sector by using a font size that is larger than font sizes used for other information on the graphic overlay.

7. The apparatus of claim 1, wherein the program code is configured to run on the data processing system to receive location information and generate a graphic overlay, and wherein the graphic overlay comprises a number of sectors and a number of altitudes, and wherein the graphic overlay, responsive to a display rule, alerts an operator of an aircraft of the minimum safe altitude at a time at which the aircraft will enter a sector with the minimum safe altitude.

8. The apparatus of claim 1, wherein the number of display rules include at least one of shading rules, color rules, intensity rules, animation rules, altitude rules, position rules, special use airspace rules, and user configurable options rules.

9. The apparatus of claim 1 further comprising:
a moving map system configured to receive the display instructions and display information according to the display instructions.

10. A method for dynamic depiction of minimum altitude information, the method comprising:
dynamically creating and displaying a moving map based on a terminal chart or an enroute map and a current location of an aircraft using a moving map system in an electronic flight bag and in a data processing system;
receiving dynamic location information for a dynamic location on the moving map system, wherein the moving map system displays an aircraft approaching one of a plurality of sectors of a circle centered on a navigational aide, each of the plurality of sectors having corresponding minimum safe altitude information;
identifying a position and a minimum safe altitude of the aircraft using the dynamic location information;
identifying a number of display rules corresponding to the position and the minimum safe altitude;
generating display instructions using the number of display rules so that the minimum safe altitude information is presented, on the one of the plurality of sectors that the aircraft is approaching, in a color that does not blend in with a terrain data so that the terrain data does not impede identifying the minimum safe altitude; and transmitting the display instructions to the moving map system.

11. The method of claim 10 further comprising:

receiving user input for a number of configurable options; and updating the number of display rules using the user input.

12. The method of claim 11, wherein the dynamic location information is received from at least one of a global positioning system, an inertial navigation system, and a pressure altimeter.

13. The method of claim 10 wherein the dynamic location information is received from a location information system.

14. The method of claim 10, wherein the number of display rules are stored in a number of databases.

15. The method of claim 10, wherein the number of display rules may be customized by an operator using a number of configurable options, wherein the number of configurable options include selecting a distance above the minimum safe altitude that will invoke a display rule when the aircraft descends to a distance above the minimum safe altitude.

16. The method of claim 10 further comprising:

generating a graphic overlay, wherein the graphic overlay comprises a sector graphic having a number of sectors and a number of minimum safe altitudes; and transmitting the graphic overlay to the moving map system, wherein the graphic overlay, responsive to a display rule, alerts an operator of the aircraft of the minimum safe altitude at a time at which the aircraft will enter a sector with the minimum safe altitude.

17. The method of claim 10, wherein the receiving, identifying, generating, and transmitting steps occur dynamically throughout a flight of the aircraft.

* * * * *